United States Patent
Ram (10) Patent No.: US 6,553,419 B1
(45) Date of Patent: Apr. 22, 2003

(54) SYSTEM AND METHOD FOR COMPUTER SYSTEM PERFORMANCE DATA PAUSE AND RESUME CONSUMING MINIMUM DISPLAY AREA

(75) Inventor: Hari Nath Ram, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/496,835

(22) Filed: Feb. 2, 2000

(51) Int. Cl.[7] .............................................. G06F 13/00
(52) U.S. Cl. ....................................... 709/224; 709/227
(58) Field of Search ................................. 709/200, 201, 709/203, 206, 217, 218, 219, 220, 221, 222, 223, 224, 227

(56) References Cited

U.S. PATENT DOCUMENTS

| | | | | |
|---|---|---|---|---|
| 5,812,859 A | * | 9/1998 | Kamimaki et al. | 713/300 |
| 6,201,526 B1 | * | 3/2001 | Burgan | 345/685 |
| 6,259,441 B1 | * | 7/2001 | Ahmad et al. | 345/720 |

* cited by examiner

Primary Examiner—Moustafa M. Meky
(74) Attorney, Agent, or Firm—R. Michael Ananian (57) ABSTRACT

Method of pausing and resuming data collection data collection and displaying the paused and resumed data collection conditions particularly suited to networked computers in a server/client configuration including collecting data item(s) for a first process by a second process on at least one computer in response to a request from the first process to collect the data, during collection of the data item communicating a pause command from the first process to the second process, pausing collection of the data by the second process in response to the pause command, storing a time reference at which the data collection was paused, communicating a pause record to the first process as an indication that data collection has been paused, and optionally displaying a pause indication on a display device. The method may also include communicating a resume command, the second process resuming collecting data in response to receipt of the resume command, resuming collection of the data by the second process, storing a resume time reference, and optionally displaying an indication of the resume time. Advantageously, the pause indication consumes a minimum space (or no space) on the display device. The graphical display element may be a thickened portion of the line graph at the time where the data collection was paused, a vertical line, or other indicator. Displays other than line graphs may alternatively be used. System, apparatus, computer program, and computer program product implementing the inventive method are also provided by the invention.

33 Claims, 6 Drawing Sheets

SYSTEM AND METHOD FOR COMPUTER SYSTEM PERFORMANCE DATA PAUSE AND RESUME CONSUMING MINIMUM DISPLAY AREA

FIELD OF THE INVENTION

The present invention relates generally to the collection and display the collected performance data in a computing environment, and more particularly to the collection, storage, and efficient presentation of computer system performance data when collection of the data has been paused and resumed.

BACKGROUND

Traditional performance data (performance parameter) collection and display provides for the acquisition, storage, and graphical display of the collected performance data. Performance data may include, for example, computer system or device resource utilization as a function of time, such as for example the number of read operations or write operations, the number of cache read hits as a function of time, the volume of TCP/IP traffic on an Internet connection, page faulting in a computing unit or memory unit, as well as other computer system, device, and network parameters as are known in the art. The performance data is useful for monitoring, tuning, and optimizing the computer system, devices, and network, as well as for debugging a system (particularly a distributed network system) to identify bottlenecks in the system.

In one particular embodiment, the performance data or performance parameters may advantageously include but need not be limited to: input/output read operations per second (IOR/sec), input/output write operations per second (IOW/sec), input/output read kilobytes transferred per second (IORKB/sec), input/output write kilobytes transferred per second (IOWKB/sec), percent read cache hit per second (%CHR/sec), percent write cache hit per second (%CHW/sec). Other performance parameters of data may be collected, processed, and reported in analogous manner.

While collecting and displaying performance data is certainly useful for monitoring the computing environment, there is little benefit in continuing to collect such data when no monitoring or analysis of that data is taking place. Continuing to collect data that will not be monitored or analyzed wastes storage space, consumes processor (CPU) resources unnecessarily, and where the performance data is displayed as a function of time, occupies display screen area for performance data that is of no interest.

Traditionally, when a computer user, operator, or system administrator chose not to monitor one or more data items indicative of system performance, there were typically three options: (i) permit the collection and display applications to continue but ignore the data that is collected and displayed; (ii) close the collection and/or display application when not required, and restart the application when required; (iii) permit the collection and display application to continue executing but pause or otherwise suspend data collection and display, then resume collection and display within the executing application program.

Under the first option, the operator merely ignores the collected and displayed data. This potential solution is an alternative to a pause. The operator leaves the monitoring application executing, which uses up valuable storage space in the monitoring equipment and results in connections being open but not being used, thereby using up bandwidth and the unproductive use of system resources. This option also wastes storage space, processor resources, and display area and perhaps even more detrimentally forces the operator to view data that is of no interest. In a graphical display application of the type that permits scrolling of the data, the operator is forced to scroll though the undesired data to compare desired performance parameters that were collected before and after the undesired collection.

Under the second option, the collection and display application(s) are stopped and started. This may typically require that the operator close the data collection application, which generally means logging off all connections to the devices from which data is being collected. The operator then restarts the monitoring operation at the end of the pause period. Delays due to restarting resulting from the need to log into remote machines and so forth, result in lost time and are inefficient and cumbersome. It also typically means that each time the data collection application is stopped, a new file is created, and data continuity is disrupted. In order for later analysis to be performed, several files need be examined, and maintenance of cumulative statistics becomes cumbersome. It also means that connections must b reestablished each time data collection is to be resumed.

Under the third option, data collection pauses and a pause record is relayed to recipients. This approach pauses data collection, thereby saving storage space as well as processing resources. However, this approach allows connections to remain open and operating and the support processes continue executing with minimum overhead. Once data collection pauses, no data is relayed to the recipients until data collection resumes.

Even when the data collection application remains running but with actual data collection suspended or paused, there remain questions as to how to display the performance data graph during the pause duration, and how to distinguish from a failure to collect performance data as a result of the system, such as a network server, being so busy with higher priority tasks that it could not collect the performance data for some duration of time. In the later circumstance, the server effectively pauses data collection. In a multi-client and server environment where one client starts a pause, other clients should be able to distinguish the pause from a zero data situation. Data collection may be paused at the request of any one of the clients or when the server is too busy to provide data. When the server pauses data collection, it relays a pause record to each recipient and no further data will be sent until data collection is resumed.

One potential solution is to consider the data as zero while displaying performance data as a plot versus time. Unfortunately, this approach cannot distinguish between zero data and the pause duration and it undesirably uses display screen area even though there is no useful data during the pause.

Therefore there remains a need for system, apparatus, method, and computer program and computer program product that distinguishes a pause or delay in the display of performance data from no or zero data and yet preserves display screen space.

SUMMARY

In one aspect the invention provides a method of pausing and resuming data collection data collection and optionally displaying the paused and resumed data collection conditions where the method includes the steps of collecting at least one data item for a first computer process by a second computer process in response to a request from the first computer process to collect the data item; during collection of the data item, communicating a pause data command from the first computer process to the second computer process; pausing collection of the data item by the second computer process in response to the pause data command; storing a time reference at which the data collection was paused; communicating a pause data record to the first computer process as an indication that data collection has been paused; and displaying, by the first computer process, a pause indication on a display device.

The method may further optionally include communicating a resume data command from the first computer process to the second computer process, the second computer process resuming collecting data in response to receipt of the resume data command; resuming collection of said at least one data item by the second computer process; storing a time reference at which the collection of the data item was resumed; and optionally displaying, by the first computer process, an indication of the resume time, on the display device.

Advantageously, the pause indication consumes a minimum space (or no space) on the display device which amount of space is independent of the duration of the pause. In one embodiment, the graphical display element is a thickened portion of the line graph at the time where the data collection was paused. Displays other than line graphs may alternatively be used.

System, apparatus, computer program, and computer program product implementing the inventive method are also provided by the invention.

DETAILED DESCRIPTION OF EMBODIMENTS OF THE INVENTION

The invention will now be described in detail by way of illustrations and examples for purposes of clarity and understanding. It will be readily apparent to those of ordinary skill in the art in light of the teachings of this invention that certain changes in modifications may be made thereto without departing from the spirit or scope of the appended claims. Section headings, where provided in the detailed description, are for convenience and are not be construed as limiting the disclosure, as various aspects of the invention are described throughout the detailed description.

Figure 1:
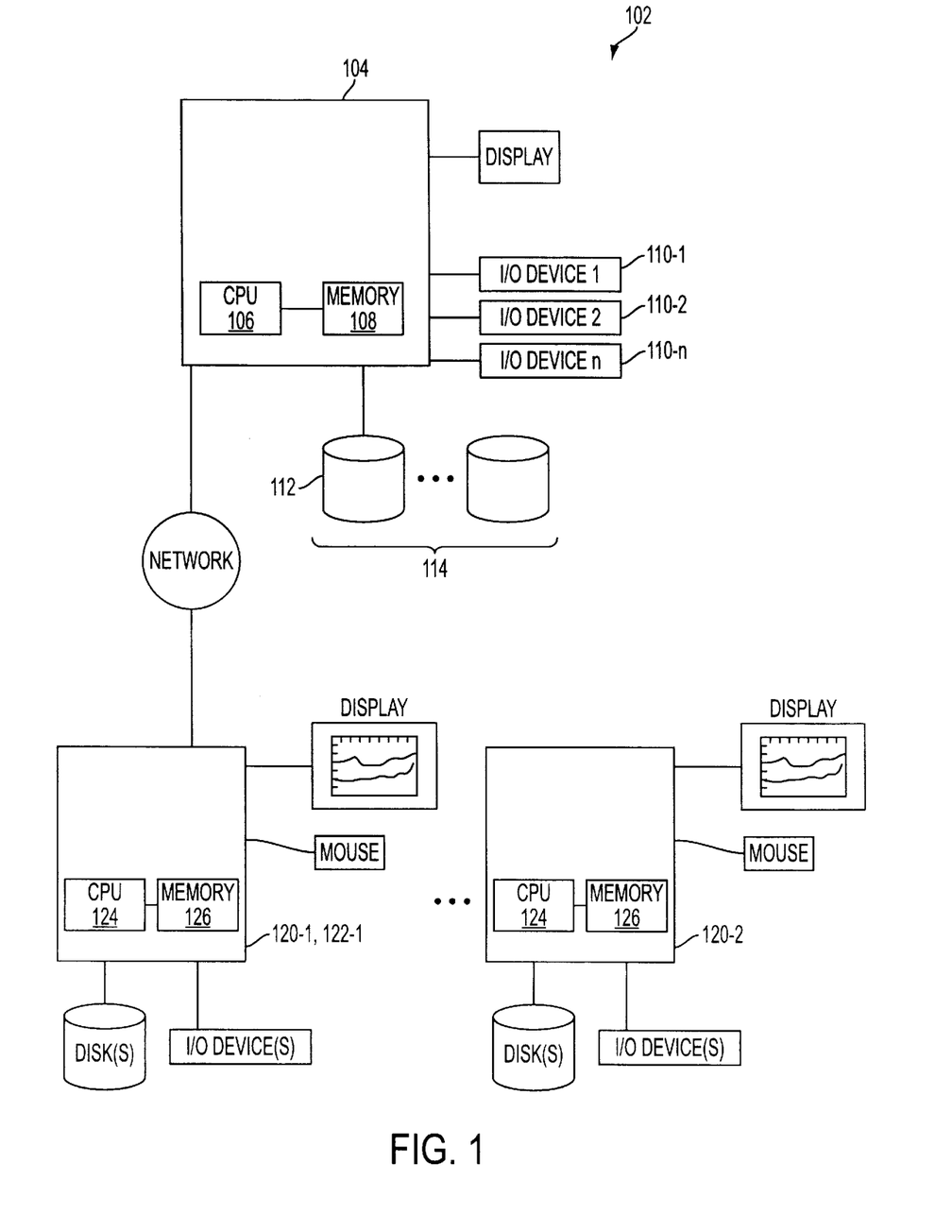
FIG. 1 is a diagrammatic illustration showing an embodiment of the computer system according to one embodiment of the invention.

With reference to FIG. 1 there is illustrated an exemplary embodiment of a computer system 102 with which the invention may be used. A first computer referred to as the server computer 104 includes a processor or central processing unit (CPU) 106, a memory (such as RAM) 108 coupled to the processor, and one or more input/output devices 110. The server 104 will also typically include some mass storage devices, such as a plurality of hard disk drive storage devices 112 configured as a data storage subsystem 114. A RAID data storage subsystem may readily be used. Memory 108 stores data and procedures, including for example performance data and one or more of the inventive procedures for collecting, storing, and/or displaying the performance data as described in greater detail hereinafter.

The computer system also typically includes one or more workstations 120 referred to as the client computer 122 different from the server 104, though in at least one embodiment of the invention, the client computer 122 is the same as the server computer 104. Each client computer 122 also includes a processor or CPU 124, and memory (such as RAM) 126 for storing data and procedures, including the performance data, performance pause record(s), and procedures described in greater detail hereinafter.

In general, the client computer(s) 122 are coupled or at least coupleable to the server computer via a network connection. The connection may be via dedicated copper wires, fiber optic, Internet, or other connectivity schemes and protocols as are known in the art.

In the following description, the term "client" refers to any application reading performance data from another system, such as from a server or a workstation. The client may be on the server machine or on any other machine coupled or coupleable to the server machine, such as through a direct connection or through a TCP/IP network, or via any other connection whether permanent or intermittent. The term server is generally applied to the application program or programs that execute on the server computer, and the term client is generally applied to the application program or programs that execute on the client computer or workstation. However, it is noted that the client application program may also execute on the server computer so that these terms are broad by their nature.

In one embodiment of the inventive structure, system, method, and computer program, the client can pause and resume data collection on the server by issuing PAUSE and RESUME commands (or their equivalent) respectively. Data items collected may include one or more of computer system or device resource utilization as a function of time, such as for example the number of read operations or write operations, the number of cache read hits as a function of time, the volume of TCP/IP traffic on an Internet connection, page faulting in a computing unit or memory unit, as well as other computer system, device, network parameters, as well as other system, device, and network data as are known in the art. Issuance of the PAUSE command by the client causes suspension of data collection on the server and relay of a pause record to the client. Issuance of the RESUME command by the client causes resumption of data collection on the server and relay of regular data to the client. Note that the use of the terms PAUSE and RESUME are intended only to describe these operations in a generic sense and are not tied to any particular applications program (AP) or operating system (OS) environment. The inventive structure, system, method, and computer program may for example be used in a Microsoft Windows OS environment (e.g. Windows NT 4.0, Windows NT 2000, Windows 95, Windows 98, Windows 2000), Unix, Linux, Solaris, Netware, as well as any other conventional OS, and in modifications, extensions, and improvements to such OS environments.

In one embodiment, each client receives the same data from the server so that when one particular client (e.g. Client A) issues the PAUSE command, this pauses data collection at the server and thus pauses data collection for all of the clients (e.g. Client B as well as Client A). The server maintains only one set of data. This single data set approach is very efficient and preferred.

In an alternative embodiment, when one particular client (e.g. Client A) issues the PAUSE command, this stops data collection and data display for that particular client (Client A) but does not stop data collection or display for another client (e.g. Client B). In this embodiment, each client initiates a separate data collection and monitoring process or application program so that in the event that two different clients desire to collect performance data, each of the two clients executes separate application programs (e.g. Application Program A and Application Program B), and each client likewise controls and pauses or resumptions of data collection and display by the two separate programs. Of course any plurality of clients may similarly execute, pause, resume, and/or terminate their respective application program.

The client application program executes as a process on the client machine (which in some instances may be the server machine as well) and communicates with the server by sending different commands to the server to start data collection, pause/resume data collection, set time interval, and by receiving data stream containing different type of records from the server in response to the requests made by the client. The server inserts a pause record (PR) into the data stream that is sent from the server to a client when a pause begins in response to the client issuing the PAUSE command. The client merely communicates a pause command to the server which takes the action to pause data collection.

In one embodiment of the invention, the data steam may include the following types of records several of which are desirable but optional: signature, version, data creation day, pause (data capture stopped), system IP address, data capture time, relative time from last data capture time, system information, controller information, physical device information, system device information, unused page indicator (rest of the page is unused), driver version, system start time, sample period (data capture interval), and device performance data (for example, physical device read performance data, physical device write performance data, physical device read+write performance data, system device read performance data, system device write performance data, system device read+write performance data). A pause record is inserted in the data stream whenever the pause occurs. The user may cause a pause or a pause may result when the server is too busy to collect performance data. In either case a Pause record is inserted into the data stream. Data collected by a client from the server is used to construct and plot a graph or other two dimensional display for performance display and for analysis. The data stream format for one particular preferred embodiment of the invention is indicated in Table I. While there are many ways in which the described data may be packaged or otherwise provided in the data stream and/or stored, pseudo code identifying characteristics of the data structures for different types of records described for a preferred embodiment is provided in Appendix I.

In another embodiment, when any one client has already requested performance data, and another client subsequently requests performance data, data is only collected once by the server and the second requesting client receives the same performance data as the first requesting client. Recall that for the preferred embodiment, when any client issues a pause command, data collection will be paused on the server for each client, and when any client issues a RESUME command, data collection is resumed for all clients. Other implementations may alternatively be provided.

In one embodiment, the pause record is conveniently a 4-byte structure in which the first byte indicates that it is a pause (pause ID) record. The other three bytes are not used in this embodiment. The pause record is preceded by either an Absolute time record or a Relative time record from which start time of the pause is computed. The Pause Record is followed by an Absolute Time record which tells when the pause ended.

TABLE I

Exemplary Data Steam Format

| Item No. | Description |
|---|---|
| 1 | Signature |
| 2 | Version |
| 3 | Data creation day |
| 4 | Pause (Data capture stopped) |
| 5 | System IP address |
| 6 | Data capture time in seconds (from year 1970 reference) |
| 7 | Relative time in 10 ms from last data capture time |
| 8 | System information |
| 9 | Controller information |
| 10 | Physical device information |
| 11 | System Device information |
| 12 | Unused page (rest of the page is unused) |
| 13 | Driver version |
| 14 | System start time |
| 15 | Sample period (Data capture interval) |
| 16 | Physical device Read performance data (Four types of records: One in which each field is 1 byte, one in which each field is 2 bytes, one in which each field is 4 bytes, and one in which each field is 8 bytes.) |
| 17 | Physical device Write performance data (Four types of records: One in which each field is 1 byte, one in which each field is 2 bytes, one in which each field is 4 bytes, and one in which each field is 8 bytes.) |
| 18 | Physical device Read + Write performance data (Four types of records: One in which each field is 1 byte, one in which each field is 2 bytes, one in which each field is 4 bytes, and one in which each field is 8 bytes.) |
| 19 | System device Read performance data (Four types of records: One in which each field is 1 byte, one in which each field is 2 bytes, one in which each field is 4 bytes, and one in which each field is 8 bytes.) |
| 20 | System device Write performance data (Four types of records: One in which each field is 1 byte, one in which each field is 2 bytes, one in which each field is 4 bytes, and one in which each field is 8 bytes.) |
| 21 | System device Read + Write performance data (Four types of records: One in which each field |

TABLE I-continued

Exemplary Data Steam Format

| Item No. | Description |
|---|---|
| | is 1 byte, one in which each field is 2 bytes, one in which each field is 4 bytes, and one in which each field is 8 bytes.) |

Each time in a sequence of time instances ($t_1$, $t_2$, $t_3$, $t_4$, $t_5$, ...) indicates an instance in time when data was collected on the server and sent to a client, and a time pause instance ($t_p$) and a time resume instance ($t_r$). The data stream at time $t_1$ (data collection start time) includes Signature record, Absolute time record, sample time record, the information records, and Performance Data records. The data stream at times $t_2$, $t_3$, $t_4$, and $t_5$ contain Absolute Time or Relative Time record, one or more performance data record, and if the sample time changed, a sample time record. The data stream for a time pause instance includes a Relative Time or Absolute Time record, the data records and the pause record. The data stream for a time resume instance includes an Absolute Time record and the data records. Either Relative time or Absolute time may be used in the data stream particularly at times $t_2$, $t_3$, $t_4$, $t_5$, ...; however, Absolute time is preferably used for a start of data collection instance ($t_1$) and time resume instance ($t_r$) as this facilitates a search through the data.

The client receives a stream of data with individual data items being received at periodic intervals and stored in a memory store, such as RAM and a file on a storage device, such as a hard disk drive or floppy disk selected by the user. The stored data is used by the client to construct graphical presentations of the data, tabular lists, or other conventional information display formats.

Figure 2:
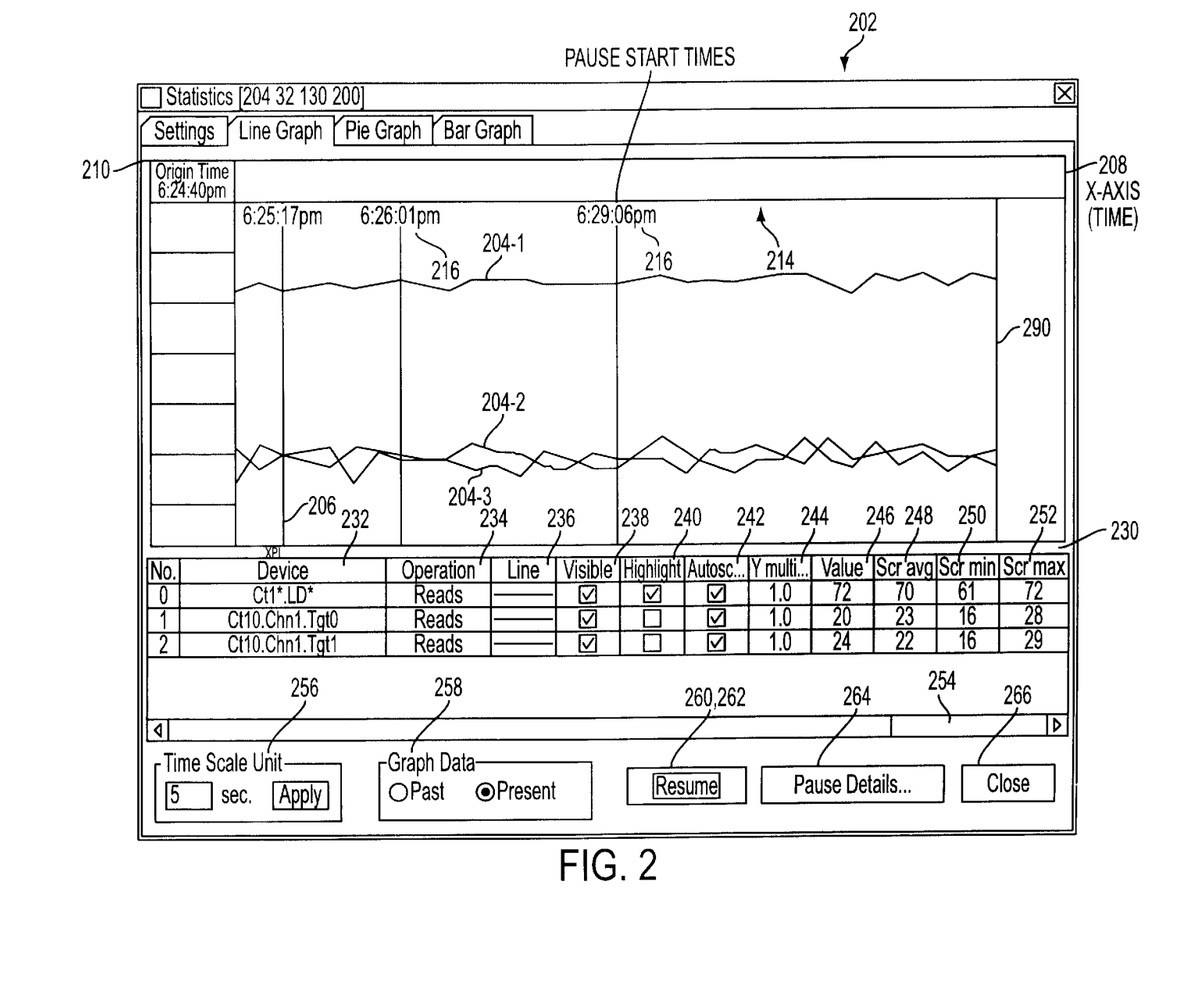
FIG. 2 is a diagrammatic illustration showing an exemplary embodiment of the performance pause feature according to the invention.

In one embodiment, the preferred display provides a graphical interface 202 with the user wherein a two-dimensional line graph 204 presents a temporal record of a selected performance parameter as a function of time, such as is illustrated in FIG. 2. In the embodiment illustrated, a plurality of different parameters are illustrated with separate line graphs 204-1, 204-2, 204-3. The pause data record received from the server identifies when the pause occurred, and the client draws a vertical line 206 at a point XP1 on the X-axis (time axis) 208 corresponding to the pause start time. When data collection is resumed, new data is displayed starting at the X-axis location XP1 206. A time calculation performed by the client compensates for the pause duration because for the pause duration no spaces along the X-axis are consumed for periods of time during which no collection or monitoring was enabled. (In one embodiment, one or two pixels or spaces are consumed bu the line, dot, bar, or other symbol.) During scrolling of the display along the x-axis 208, or when data is being displayed from a saved file, the x-axis location calculation always compensates for the pause duration.

Figure 3:
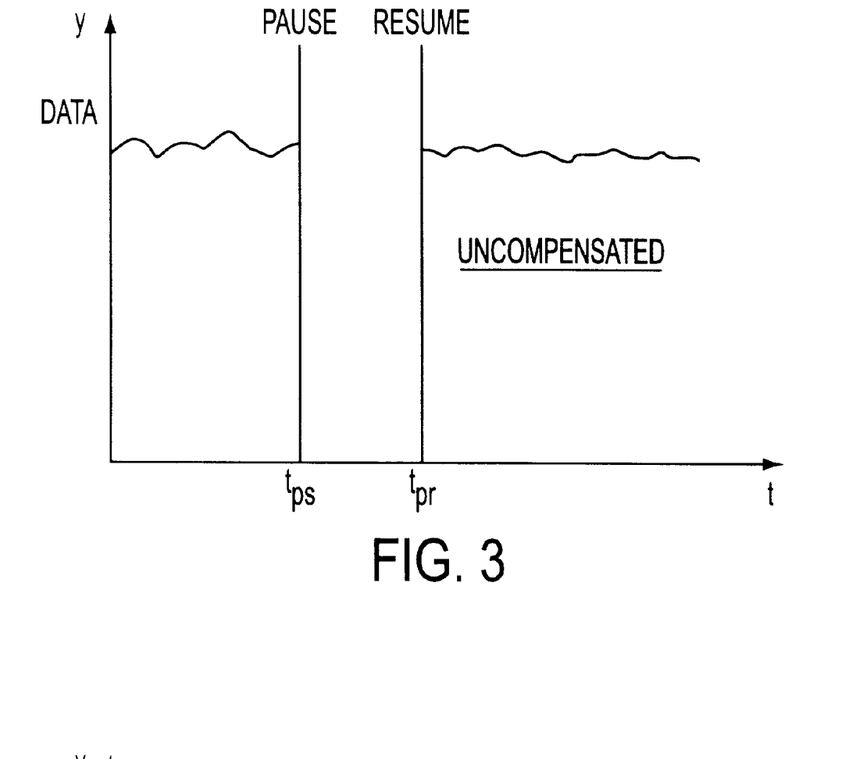
FIG. 3 is a diagrammatic illustration showing a graphical display having a time line that has not been compensated for the duration of the pause.
Figure 4:
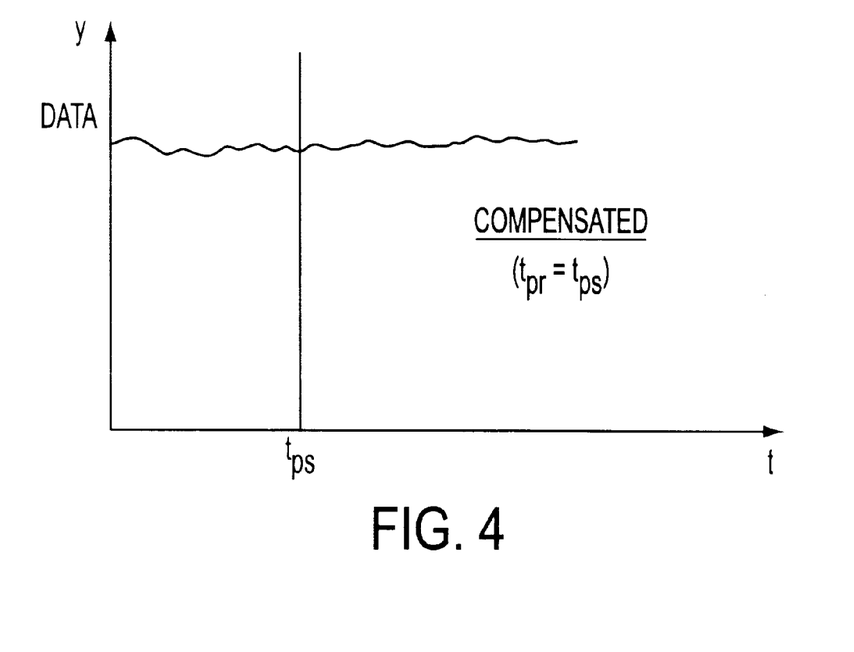
FIG. 4 is a diagrammatic illustration showing a graphical display having a compensated time line axis compensated for the duration of the pause according to an embodiment of the invention.

This operation and functionality is described relative to FIG. 3 which illustrates a graphical display having an uncompensated time line axis, and FIG. 4 which illustrates a graphical display having a compensated time line axis. The time axis (here the horizontal axis) is compensated for the duration of the pause so that the duration of the pause becomes an essentially zero width region for purposes of graphical display and saves display space.

In one preferred embodiment, the line graph identifies the absolute time corresponding to the x-axis origin ("0") in an upper-left corner region of the display 210, the display presents timing ticks 214 corresponding to some interval of time which may be selected by the user to show data at the desired temporal resolution or scale (1 minute tics in FIG. 2, and the display resume or restart time(s) 216 in hour:minute:second format (e.g. 6:29:06 pm) at the top of the vertical pause line 206 adjacent to the x-axis time tics 216. Note that the restart time equals the pause end as well as the resume time, and these terms are used interchangeably here. Of course those workers having ordinary skill in the art in light of the description provided here will appreciate that the line graphs 204, x-axis time tics 214, origin time 210, and display restart time(s) 216 may be presented in different manner or at other locations than that illustrated in FIG. 2, and that other or different information may also be presented. For example, the pause start time may be displayed in addition to or instead of the display restart time, or the pause duration may be displayed instead of or in addition to either the pause start time or the display restart time.

In the embodiment of the display in FIG. 2, additional but optional information is also provided in the lower portion of the display screen. For example, a table 230 identifying a device name or other identifier 232, an operation (e.g. read) 234, the line style or color 236, whether the line is made visible or invisible on the current display (selectable by the user) 238, whether the line is highlighted 240, an autoscaling 242 indicating automatic calculation of a Y-axis multiplier, a Y-axis multiplier or scale factor 244, a value 246 of the last data read at the current time, a screen average (Scr avg) 248, a screen minimum (Scr min) 250, and a screen maximum (Scr max) 252. The screen average is the average of the date currently displayed on the display screen. A scroll bar 254 is provided for changing the currently displayed data at the selected time scale. Time scale 256, graph data 258, resume 260 and/or pause 262, pause details 264, and close 266 display regions and buttons are also provided.

The last data read is marked by a vertical red line 290 or other distinguishable graphical indicator on the graph. Three other parameters may also desirably be displayed. They are the Full Average (full avg) which is the average from the start of the data collection to the current time, the full minimum (full min) which is the minimum from the start of the data collection to the current time, and the Full Maximum (full max) which is the maximum from the start of the data collection to the current time The device name or other identifier in table 320 may specify for example, Controller 'All' (Ct1*), Controller 0 (Ct10), Logical Drive 'All' (LD*), Logical Drive 0 (LD0), Channel 1 (Chn1), Target 2 (tgt2), or the like. These device identifiers are illustrative only and other devices and/or types of identifiers may be used.

Figure 5:
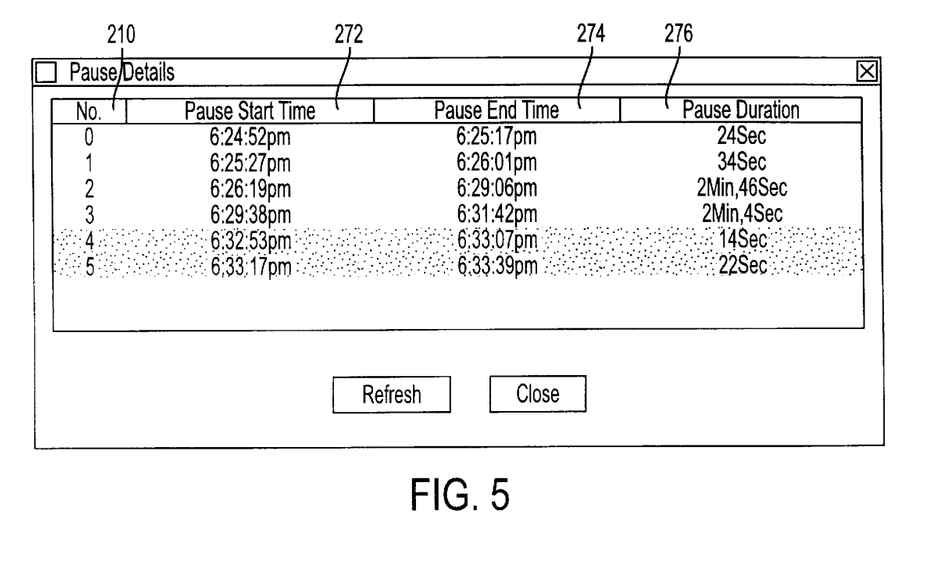
FIG. 5 is a diagrammatic illustration showing an exemplary embodiment of the performance pause detail table according to the invention.

The resume button 260 permits the user to issue the RESUME command when the display is paused. When data collection is in progress, the pause button 262 is displayed instead of the resume button so that the user may conveniently pause the performance data collection and display. The "Pause Details . . . " menu button causes an additional display to appear as illustrated in FIG. 5 which lists the pause event number 270, pause start time 272, pause end time 274, and pause duration 276. Refresh 278 and Close 280 menu buttons are also provided.

Alternatively, the placement and numbering of the x-axis timing tics may be altered to indicate pauses and restarts and/or to indicate an absolute time relative to either or bot events. Finally, other graphical or tabular presentations may be provided to communicate the same or similar information. For example, pie graphs or bar graphs may be used instead of line graphs, and tables of information may be used instead or in addition to the graphical information. In one preferred embodiment, performance data are presented as line graphs and additional textual and tabular data is presented below the line graphs and on separate user selectable tabular displays in a pull-down or tabbed graphical user interface. One embodiment of a table presenting detailed pause information, including pause number 270, pause start time 272, pause end time 274, and pause duration 276 is illustrated in FIG. 5. The pause detail window displays information about all pauses with the pause detail for any then currently visible pause lines highlighted in contrasting color and/or brightness. As the operator scrolls the line graph so that a different set of pause lines are displayed in the viewing window, these different pause lines are highlighted.

By displaying pause information by a single vertical line (or other small indicator) display screen space is used efficiently and without losing any information. The pause line clearly identifies when the pause occurred, and the user has the added benefit of being able to directly combine and compare performance data collected during different periods in side-by-side comparison. For example, the user may choose to collect performance data for a predetermined amount of time (for example for a 2 minute interval), at 1 hour intervals. The user simply initiates data collection and allows data to continue for 2 minutes, then pauses for 58 minutes, resumes for 2 minutes, and the like. The PAUSE and RESUME commands may be manually entered or programmed into a batch file or the like so that they are issued automatically.

Figure 6:
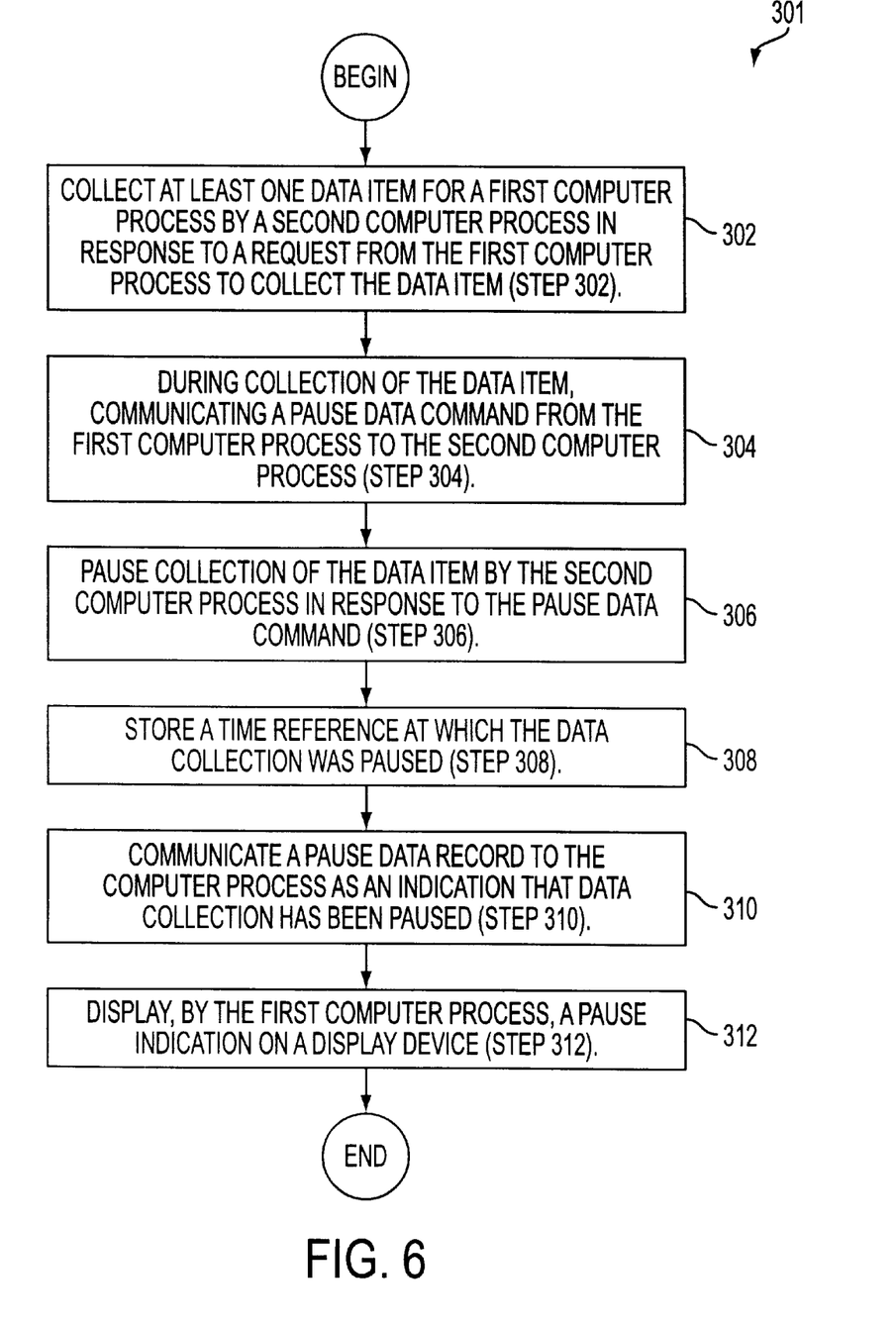
FIG. 6 is a diagrammatic illustration showing an exemplary flow-chart of the inventive procedure of pausing and resuming data collection and displaying said pause and resume data collection conditions.

We now describe embodiments of some of the inventive procedures and computer software that contribute to aspects of the invention. With respect to FIG. 6 which shows a flow-chart of a method of pausing and resuming data collection and displaying the pause and resume data collection conditions (Step 301) in a computer or information handling system. In one embodiment the method comprises the steps of: (a) collecting at least one data item for a first computer process by a second computer process in response to a request from the first computer process to collect the data item (Step 302); (b) during collection of the data item, communicating a pause data command from the first computer process to the second computer process (Step 304); (c) pausing collection of the data item by the second computer process in response to the pause data command (Step 306); (d) storing a time reference at which the data collection was paused (Step 308); (e) communicating a pause data record to the first computer process as an indication that data collection has been paused (Step 310); and (f) displaying, by the first computer process, a pause indication on a display device (Step 312).

In one embodiment, the pause indication displayed desirably consumes a minimum space on the display device which is independent of the duration of the pause. In another embodiment, the displaying further comprising displaying a line graph of values of the data item plotted as a function of time on the display device, and the pause indication comprising a graphical display element located at the terminal end of the graph of values corresponding substantially to a time of the last value collected before the pause. In yet another embodiment, the graphical display element comprises a thickened portion of the line graph at the time where the data collection was paused. In one embodiment, the pause data record is communicated in a data stream having a plurality of the data items. Desirably, the pause data record includes a time reference.

In another embodiment, the thickened portion of the line graph comprising a line extending across a portion of the line graph at a location corresponding to the pause time; and in yet another embodiment, the line extending across the line graph comprising a two-pixel wide line with height substantially equal to the graph display height area.

The method of pausing and resuming data collection and displaying the pause and resume data collection conditions may be implemented such that the first computer process comprises a client application program and the second computer process comprises a server application program. The method may alternatively be implemented such that the method further comprises steps of: communicating a resume data command from the first computer process to the second computer process, the second computer process resuming collecting data in response to receipt of the resume data command; resuming collection of the at least one data item by the second computer process; storing a time reference at which the collection of the data item was resumed; and displaying, by the first computer process, an indication of the resume time, on the display device. Optionally, the indication of the resume time may comprise a time indication displayed with the pause indicator line. The time indication adjacent the pause indicator line may in one embodiment comprise an absolute time indication of the resume time. In one embodiment, when the display is scrolled to reveal different areas of the display, for example, different time values, the method further includes scrolling the display to present values of the at least one data item for different time periods, and when scrolling, compensating for the duration of time between the pause and the resume.

The inventive method of pausing and resuming data collection and displaying the pause and resume data collection conditions may optionally include the step of providing a display of one or more of the pause start time, the pause resume time, and the pause duration.

It is noted that the first computer process may be a client application program and the second computer process may be a server application program. Alternatively, the client application program and the server application programs may be the same application program or they may be different application programs. The client application program and the server application program may be executing on the same computer or on different computers, and even on different processors within the same computer. Even the client application program may comprises a data control component and a data display component, the data control component controlling the pause and resume elements of the procedure and the data display component controlling the data display elements of the procedure.

In another embodiment, the data control component is responsible for initiating data collection, for pausing and resuming data collection, and for terminating data collection; and the data display component is responsible for displaying data collected, including for displaying the pause indicator and the resume indicator. In such a situation, the data control component is desirably implemented as a first client application program or programs and the data display component is implemented as a second client application program or programs.

The method of pausing and resuming data collection and displaying the pause and resume data collection conditions may be implemented such that at least one data item is selected from the group consisting of computer system or device resource utilization as a function of time, the number of read operations or write operations, the number of cache read hits, the volume of network traffic, the volume of TCP/IP traffic on an Internet connection, page faulting in a computing unit or memory unit, computer system parameters, device parameters, network parameters, and combinations thereof.

Figure 7:
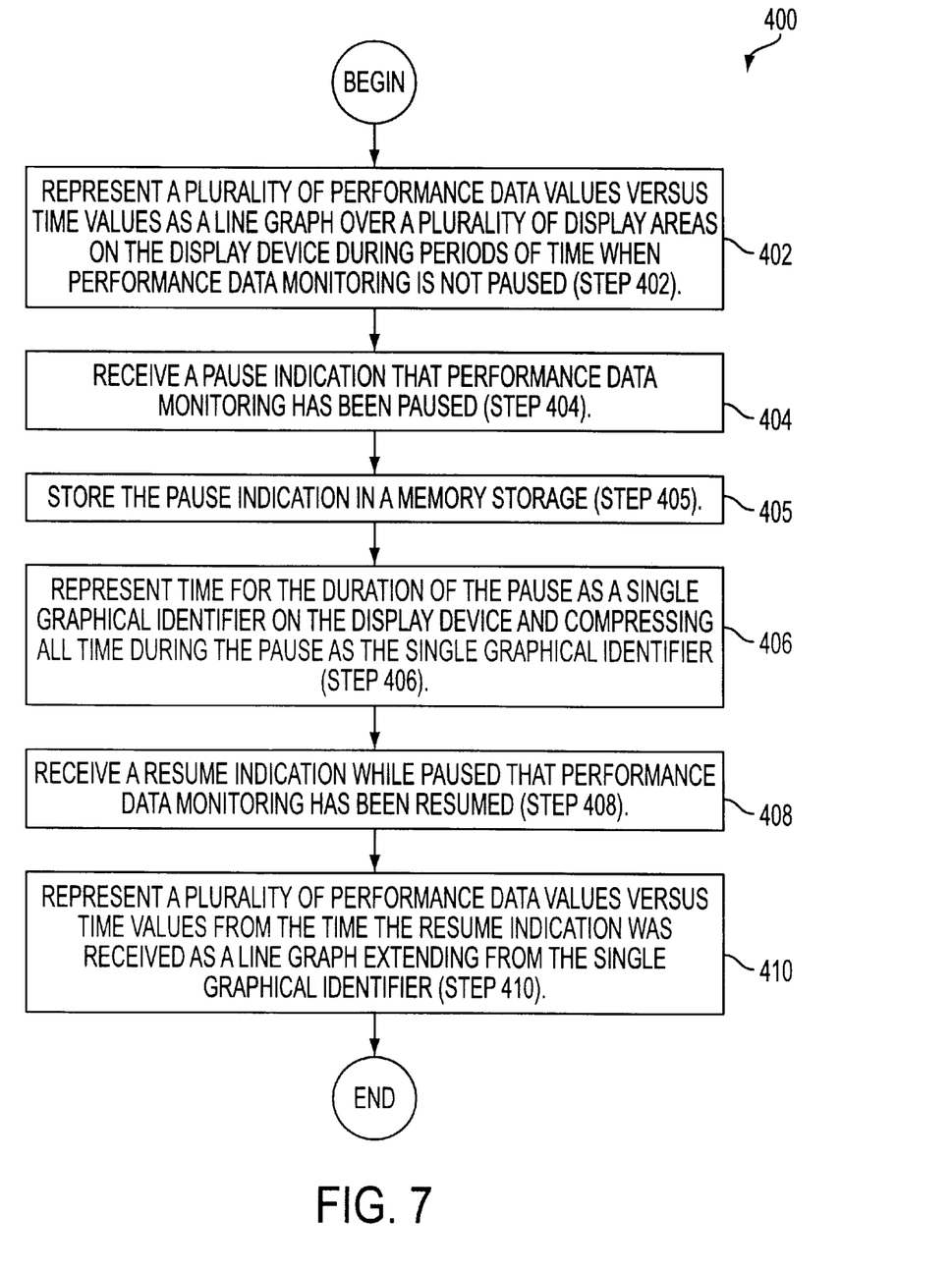
FIG. 7 is a diagrammatic illustration showing an exemplary flow-chart of the inventive procedure of representing a pause in performance data monitoring on a two-dimensional display device showing values of performance data plotted against time.

The invention also provides a method of representing a pause in performance data monitoring on a two-dimensional display device showing values of performance data plotted against time (Step 400) as illustrated in FIG. 7. The method is advantageously suited for implementing on a computer system and the method comprises the steps of: representing a plurality of performance data values versus time values as a line graph over a plurality of display areas on the display device during periods of time when performance data monitoring is not paused (Step 402); receiving a pause indication that performance data monitoring has been paused (Step 404); storing the pause indication in a memory storage (Step 405); representing time for the duration of the pause as a single graphical identifier on the display device and compressing all time during the pause as the single graphical identifier (Step 406); receiving a resume indication while paused that performance data monitoring has been resumed (Step 408); and representing a plurality of performance data values versus time values from the time the resume indication was received as a line graph extending from the single graphical identifier (Step 410).

In one embodiment of the method of representing a pause in performance data monitoring on a two-dimensional display device showing values of performance data plotted against time advantageously but optionally provides that the single graphical identifier comprises a pixel element on the display. In another embodiment, the single graphical identifier comprises a cluster of pixel elements on the display. In yet another embodiment, the single graphical identifier comprises a line on the display crossing the line graph at a time value corresponding to the time of the pause.

A computer program and computer program product stored on tangible media such as a floppy disk, CDROM, DVD, hard disk drive, or other storage media. In one embodiment, a computer program product for use in conjunction with a computer system is provided, the computer program product comprising a computer readable storage medium and a computer program mechanism embedded therein, the computer program mechanism, comprises: a program module that directs a display device connected to a computer, to function in a specified manner, the display device being operatively coupled to a first memory, the program module including instructions for: representing a plurality of performance data values versus time values as a line graph over a plurality of display areas on the display device during periods of time when performance data monitoring is not paused; receiving a pause indication that performance data monitoring has been paused; storing the pause indication in a memory storage; representing time for the duration of the pause as a single graphical identifier on the display device and compressing all time during the pause as the single graphical identifier; receiving a resume indication while paused that performance data monitoring has been resumed; and representing a plurality of performance data values versus time values from the time the resume indication was received as a line graph extending from the single graphical identifier.

In another embodiment, a computer program product for use in conjunction with a computer system is provided, the computer program product comprising a computer readable storage medium and a computer program mechanism embedded therein, the computer program mechanism, comprising: a program module that directs a computer to function in a specified manner, the program module including instructions for: collecting at least one data item for a first computer process by a second computer process in response to a request from the first computer process to collect the data item; during collection of the data item, communicating a pause data command from the first computer process to the second computer process; pausing collection of the data item by the second computer process in response to the pause data command; storing a time reference at which the data collection was paused; communicating a pause data record to the first computer process as an indication that data collection has been paused; and displaying, by the first computer process, a pause indication on a display device.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. All patents and publications referenced herein are hereby incorporated by reference.

What is claimed is:

1. In a computing system, a method of pausing and resuming data collection and displaying said pause and resume data collection conditions, said method comprising steps of:

collecting at least one data item for a first computer process by a second computer process in response to a request from said first computer process to collect said data item;

during collection of said data item, communicating a pause data command from said first computer process to said second computer process;

pausing collection of said data item by said second computer process in response to said pause data command;

storing a time reference at which said data collection was paused;

communicating a pause data record to said first computer process as an indication that data collection has been paused; and displaying, by said first computer process, a pause indication on a display device.

2. The method of claim 1, wherein said pause indication consumes a minimum space on said display device which is independent of the duration of said pause.

3. The method of claim 1, wherein said displaying further comprising displaying a line graph of values of said data item plotted as a function of time on said display device, said pause indication comprising a graphical display element located at the terminal end of said graph of values corresponding substantially to a time of said last value collected before said pause.

4. The method of claim 3, wherein said graphical display element comprising thickened portion of said line graph at said time where said data collection was paused.

5. The method of claim 4, wherein said thickened portion of said line graph comprising a line extending across a portion of said line graph at a location corresponding to said pause time.

6. The method of claim 5, wherein said line extending across said line graph comprising a two-pixel wide line with height substantially equal to the graph display height area.

7. The method of claim 1, wherein said first computer process comprises a client application program and said second computer process comprises a server application program.

8. The method of claim 1, wherein said method further comprises steps of:
 communicating a resume data command from said first computer process to said second computer process, said second computer process resuming collecting data in response to receipt of said resume data command;
 resuming collection of said at least one data item by said second computer process;
 storing a time reference at which said collection of said data item was resumed; and
 displaying, by said first computer process, an indication of said resume time, on said display device.

9. The method of claim 8, wherein said indication of said resume time comprising a time indication displayed with said pause indicator line.

10. The method of claim 8, wherein said time indication adjacent said pause indicator line comprises an absolute time indication of said resume time.

11. The method of claim 8, wherein said method further comprises step of:
 scrolling said display to present values of said at least one data item for different time periods, and when scrolling, compensating for the duration of time between said pause and said resume.

12. The method of claim 11, wherein said compensating comprising steps of treating the duration of time between said pause and said resume as a zero time interval.

13. The method of claim 8, wherein said method further comprises step of:
 providing a display of said pause start time, said pause resume time, and said pause duration.

14. The method of claim 8, wherein said first computer process comprises a client application program and said second computer process comprises a server application program.

15. The method of claim 14, wherein said client application program and said server application programs are the same application program.

16. The method of claim 15, wherein said client application program and said server application programs are different application programs.

17. The method of claim 15, wherein said client application program and said server application program are executing on the same computer.

18. The method of claim 15, wherein said client application program and said server application program are executing on two different computers.

19. The method of claim 15, wherein said client application program comprises a data control component and a data display component.

20. The method of claim 19, wherein said data control component is responsible for initiating data collection, for pausing and resuming data collection, and for terminating data collection; and said data display component is responsible for displaying data collected, including for displaying said pause indicator and said resume indicator.

21. The method of claim 20, wherein said data control component is implemented as a first client application program and said data display component is implemented as a second client application program.

22. The method of claim 8, wherein said at least one data item is selected from the group consisting of computer system or device resource utilization as a function of time, the number of read operations or write operations, the number of cache read hits, the volume of network traffic, the volume of TCP/IP traffic on an Internet connection, page faulting in a computing unit or memory unit, computer system parameters, device parameters, network parameters, and combinations thereof.

23. The method of claim 1, wherein said pause data record is communicated in a data stream having a plurality of said data items.

24. The method of claim 23, wherein said pause data record includes said time reference.

25. The method of claim 1, wherein said at least one data item is selected from the group consisting of computer system or device resource utilization as a function of time, the number of read operations or write operations, the number of cache read hits, the volume of network traffic, the volume of TCP/IP traffic on an Internet connection, page faulting in a computing unit or memory unit, computer system parameters, device parameters, network parameters, and combinations thereof.

26. In a computing system, a method of representing a pause in performance data monitoring on a two-dimensional display device showing values of performance data plotted against time, said method comprising steps of:
 representing a plurality of performance data values versus time values as a line graph over a plurality of display areas on said display device during periods of time when performance data monitoring is not paused;
 receiving a pause indication that performance data monitoring has been paused;
 storing said pause indication in a memory storage;
 representing time for the duration of said pause as a single graphical identifier on said display device and compressing all time during said pause as said single graphical identifier;
 receiving a resume indication while paused that performance data monitoring has been resumed; and
 representing a plurality of performance data values versus time values from the time said resume indication was received as a line graph extending from said single graphical identifier.

27. The method of claim 26, wherein said single graphical identifier comprises a pixel element on said display.

28. The method of claim 26, wherein said single graphical identifier comprises a cluster of pixel elements on said display.

29. The method of claim 26, wherein said single graphical identifier comprises a line on said display crossing said line graph at a time value corresponding to the time of said pause.

30. A computer program product for use in conjunction with a computer system, the computer program product comprising a computer readable storage medium and a computer program mechanism embedded therein, the computer program mechanism, comprising:
 a program module that directs a display device connected to a computer, to function in a specified manner, the display device being operatively coupled to a first memory, the program module including instructions for:
  representing a plurality of performance data values versus time values as a line graph over a plurality of display areas on said display device during periods of time when performance data monitoring is not paused;
  receiving a pause indication that performance data monitoring has been paused;
  storing said pause indication in a memory storage;
  representing time for the duration of said pause as a single graphical identifier on said display device and compressing all time during said pause as said single graphical identifier;

receiving a resume indication while paused that performance data monitoring has been resumed; and representing a plurality of performance data values versus time values from the time said resume indication was received as a line graph extending from said single graphical identifier.

31. A computer program product for use in conjunction with a computer system, the computer program product comprising a computer readable storage medium and a computer program mechanism embedded therein, the computer program mechanism, comprising:

a program module that directs a computer to function in a specified manner, the program module including instructions for:

collecting at least one data item for a first computer process by a second computer process in response to a request from said first computer process to collect said data item;

during collection of said data item, communicating a pause data command from said first computer process to said second computer process;

pausing collection of said data item by said second computer process in response to said pause data command;

storing a time reference at which said data collection was paused;

communicating a pause data record to said first computer process as an indication that data collection has been paused; and displaying, by said first computer process, a pause indication on a display device.

32. A computing system comprising:

at least one computer having a processor and a memory coupled to said processor, said memory storing data and at least one executable procedure;

a display device capable of displaying two-dimensional graphical data representing performance data values plotted against time;

said executable procedure including instructions for:

collecting at least one data item for a first computer process executing on one of said at least one computers by a second computer process in response to a request from said first computer process to collect said data item;

during collection of said data item, communicating a pause data command from said first computer process to said second computer process;

pausing collection of said data item by said second computer process in response to said pause data command;

storing a time reference at which said data collection was paused;

communicating a pause data record to said first computer process as an indication that data collection has been paused; and displaying, by said first computer process, a pause indication on a display device.

33. The computer system in claim 32, wherein said at least one computer includes a server computer and a client computer, and wherein said second computer process executes on said server computer and said first computer process executes on said client computer.

* * * * *